United States Patent
Miller et al.

(10) Patent No.: US 6,823,512 B1
(45) Date of Patent: *Nov. 23, 2004

(54) APPARATUS AND METHOD FOR PROVIDING AND PROCESSING PRIORITIZED MESSAGES IN AN ORDERED MESSAGE CLUSTERED COMPUTING ENVIRONMENT

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/484,105

(22) Filed: Jan. 14, 2000

Related U.S. Application Data

(63) Continuation-in-part of application No. 09/438,207, filed on Nov. 12, 1999, now Pat. No. 6,625,639, which is a continuation-in-part of application No. 09/421,585, filed on Oct. 20, 1999.

(51) Int. Cl.[7] .............................................. G06F 9/00
(52) U.S. Cl. ..................... 718/103; 718/100; 718/102; 709/201; 709/202; 709/203
(58) Field of Search ................................ 718/100, 101, 718/102, 103, 106, 105; 370/401, 410, 412, 465; 709/201, 227, 230; 710/4

(56) References Cited

U.S. PATENT DOCUMENTS

| | | | | |
|---|---|---|---|---|
| 4,667,323 A | * | 5/1987 | Engdahl et al. | 370/451 |
| 5,515,538 A | * | 5/1996 | Kleiman | 710/260 |
| 5,517,668 A | * | 5/1996 | Szwerinski et al. | 709/230 |
| 5,790,804 A | * | 8/1998 | Osborne | 709/245 |
| 6,006,247 A | * | 12/1999 | Browning et al. | 718/102 |
| 6,144,669 A | * | 11/2000 | Williams et al. | 370/401 |
| 6,490,611 B1 | * | 12/2002 | Shen et al. | 718/103 |
| 6,625,639 B1 | * | 9/2003 | Miller et al. | 718/106 |

\* cited by examiner

*Primary Examiner*—Majid A. Banankhah
(74) *Attorney, Agent, or Firm*—Martin & Associates, LLC; Derek P. Martin

(57) ABSTRACT

A clustered computer system includes multiple computer systems (or nodes) on a network that can become members of a group to work on a particular task. Each node includes a main thread and one or more work threads. The main thread receives messages from other computer systems in the group, and routes messages intended for the work thread to a response queue and a work queue in the work thread, depending on the type of the message. If the message is a response to a currently-executing task, the message is placed in the response queue in the work thread. If the message is a new non-priority task that needs to be processed, the message is routed to the work queue in the work thread. If the message is a priority message, the message is written to both the work queue and the response queue in the work thread. A priority message processing mechanism uses a priority queue defined in the work thread to assure that the priority message is processed the next time the work thread is ready to process a new task, even if the priority message was received after other tasks have been sent to the work queue.

34 Claims, 6 Drawing Sheets

APPARATUS AND METHOD FOR PROVIDING AND PROCESSING PRIORITIZED MESSAGES IN AN ORDERED MESSAGE CLUSTERED COMPUTING ENVIRONMENT

RELATED APPLICATION

This patent application is a continuation-in-part of Ser. No. 09/438,207 entitled "Apparatus and Method for Processing a Task in a Clustered Computing Environment", filed on Nov. 12, 1999, U.S. Pat. No. 6,625,639, which is a continuation-in-part of Ser. No. 09/421,585 entitled "Apparatus and Method for Passively Liveness of Jobs in a Clustered Computing Environment", filed on Oct. 20, 1999 which is incorporated herein by reference.

BACKGROUND OF THE INVENTION

1. Technical Field

This invention generally relates to data processing, and more specifically relates to the sharing of tasks between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With multiple computers hooked together on a network, it soon became apparent that networked computers could be used to complete tasks by delegating different portions of the task to different computers on the network, which can then process their respective portions in parallel. In one specific configuration for shared computing on a network, the concept of a computer "cluster" has been used to define groups of computer systems on the network that can work in parallel on different portions of a task.

One way for computers in a cluster to cooperate to perform a task uses the concept of ordered messages. In an ordered message system, each message is communicated to all nodes, and the order of messages is enforced so that all nodes see the messages in the same order. However, there may be a need to process some special messages in an expedited manner, before messages that were previously received. For example, if one of the nodes in a cluster fails, it may be desirable to process a message indicating the failure rather than processing other messages that were received prior to the failure message. To process special messages (referred to herein as priority messages), each node must implement a common mechanism and method for processing priority messages so that the priority message may be processed out-of-order with respect to previously-received message while maintaining a common ordering of messages between nodes. Without a mechanism and method for providing and processing priority messages in a clustered computing system, the computer industry will continue to suffer from known mechanisms and methods that do not allow any message to be processed before other previously-received messages in an ordered message clustered computing environment.

DISCLOSURE OF INVENTION

According to the preferred embodiments, a clustered computer system includes multiple computer systems (or nodes) on a network that can become members of a group to work on a particular task. Each node includes a main thread and one or more work threads. The main thread receives messages from other computer systems in the group, and routes messages intended for the work thread to a response queue and a work queue in the work thread, depending on the type of the message. If the message is a response to a currently-executing task, the message is placed in the response queue in the work thread. If the message is a new non-priority task that needs to be processed, the message is routed to the work queue in the work thread. If the message is a priority message, the message is written to both the work queue and the response queue in the work thread. A priority message processing mechanism uses a priority queue defined in the work thread to assure that the priority message is processed the next time the work thread is ready to process a new task, even if the priority message was received after other tasks have been sent to the work queue.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through sharing portions of tasks on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

Computer Clusters

The prior art recognized the benefit of having groups of computer systems work on different pieces of a problem. The concept of "clusters" of computers evolved to include a predefined group of networked computers that can share portions of a larger task. One specific implementation of a cluster uses ordered messages for communicating between the computers in a cluster. In an ordered message system, each message is communicated to all nodes, and the order of messages is enforced so that all nodes see the messages in the same order.

Figure 1:
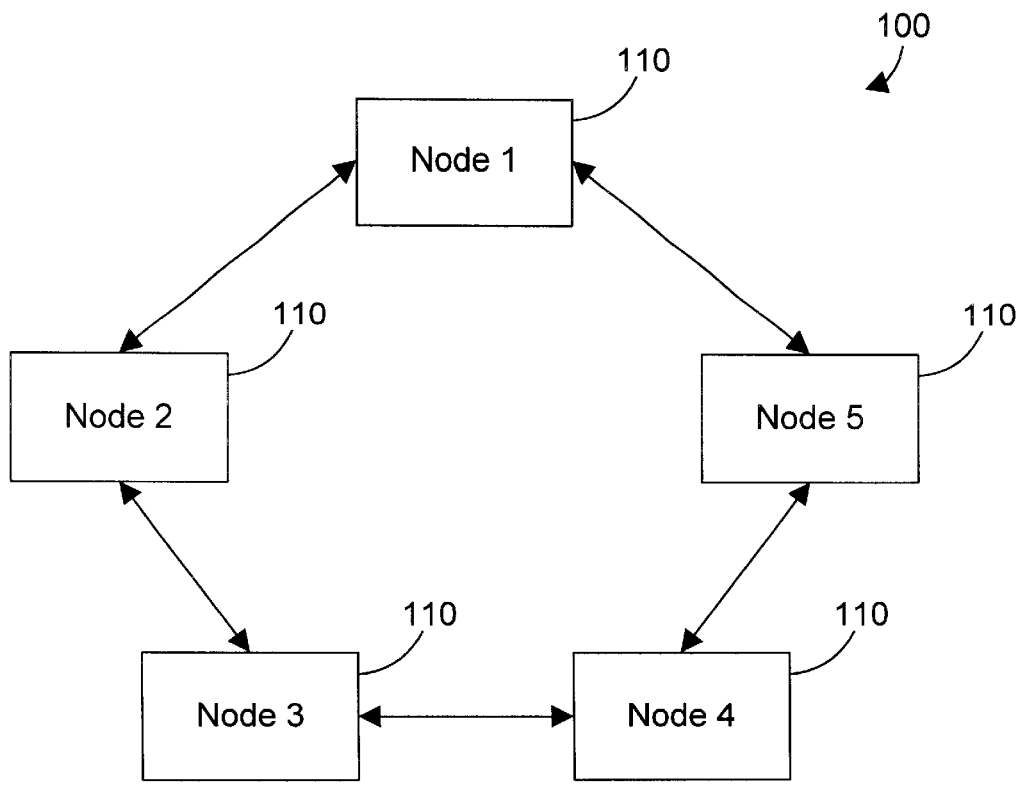
FIG. 1 is a block diagram of computer systems that may intercommunicate on a network.
Figure 2:
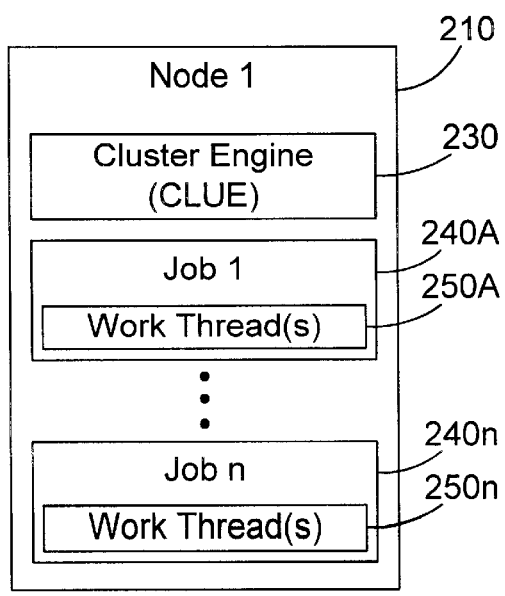
FIG. 2 is a block diagram of a prior art cluster node.

Referring to FIG. 1, a simple cluster 100 of five computer systems (or "nodes") 110 is shown. The connections between these nodes represents a logical connection, and the physical connections can vary within the scope of the preferred embodiments so long as the nodes in the cluster can logically communicate with each other. Within a cluster, one or more "groups" may be defined, which correspond to logical groupings of nodes that cooperate to accomplish some task. Each node in a group is said to be a "member" of that group. As shown in FIG. 2, each node 210 in a prior art cluster includes a cluster engine 230 (referred to herein as CLUE), and one or more jobs 240. Each job 240 includes one or more work threads 250 that execute the job 240, which amounts to a portion of the larger task that is being delegated to the members of the group.

CLUE 230 is a software process that enforces ordered messages between nodes in a cluster. All messages by any member of the group are communicated to the node's local CLUE 230, which then communicates the message to all other members of the group. When a job 240 wants to be part of a group, it registers with CLUE 230 as a member of that group. This registration causes CLUE to generate a membership change message to other members of the group to inform the other members of the new addition to the group. In similar fashion, when a job 240 no longer wants to be a member of the group, it unregisters with CLUE 230, which also causes a corresponding membership change message to inform the remaining members of the group that a member has been deleted from the group. When CLUE 230 receives a message from its member that is intended for the group, CLUE 230 sends the message to all registered members.

2. Detailed Description

According to preferred embodiments of the present invention, an apparatus and method provide priority messages that may be processed in an expedited manner in an ordered message clustered computing environment. Each work thread in this environment preferably includes a work queue, a response queue, and a priority queue. The work queue contains the next task (or protocol) to be processed. The response queue contains responses to the currently-executing protocol. The priority queue contains priority messages. When the work thread is ready to process the next message, it checks the priority queue first to see if a priority message is present before processing the next protocol on the work queue. In this manner a priority message may be processed in an expedited manner while maintaining a common ordering of messages in all members of the group.

Figure 3:
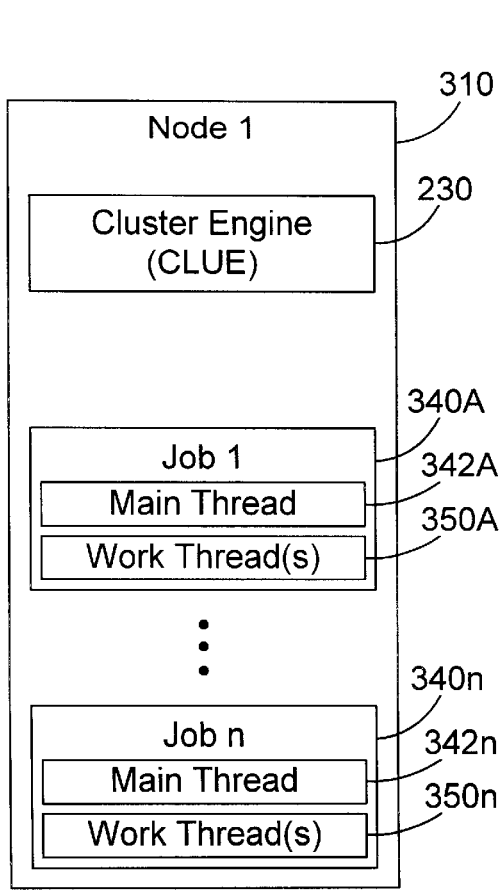
FIG. 3 is a block diagram of a node in accordance with the preferred embodiments.

Referring now to FIG. 3, a node 310 represents a node in a cluster, such as that shown in FIG. 1. Node 310 in accordance with the preferred embodiments includes a cluster engine (CLUE) 230 and one or more jobs 340. Some of the features of CLUE 230 are described above.

Figure 4:
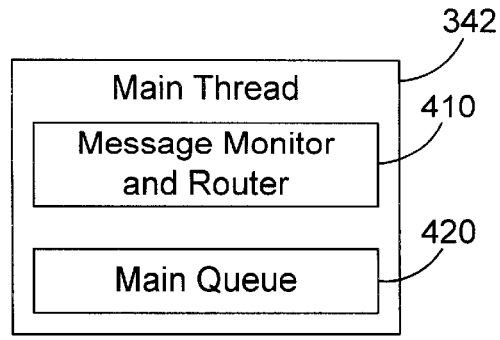
FIG. 4 is a block diagram of one sample implementation for the main thread in FIG. 3.

Each job 340 has one or more corresponding work threads 350. In addition, each job 340 also includes a single main thread 342. FIG. 4 illustrates one suitable implementation for main thread 342, which includes a message monitor and router 410 and a main queue 420. The main thread 342 does not do any work on a task defined by job 340, but is a supervisory mechanism that passes messages that it receives in its main queue 420 from CLUE 230 to the work thread(s). The message monitor and router 410 monitors all messages received from CLUE 230. If a message is a special type of message intended for the main thread 342, the main thread performs the required processing. For example, a special type of message may tell the job to kill a specified work thread, which causes main thread 342 to kill the specified work thread. If the main thread 342 kills a work thread 350, whether by request of the work thread or by some unrecoverable error that occurs in the work thread, main thread 342 may unregister with CLUE. By unregistering, all other members of the group know that the failing member is no longer a member of the group, and the remaining members can then process the error or take other appropriate action.

Figure 5:
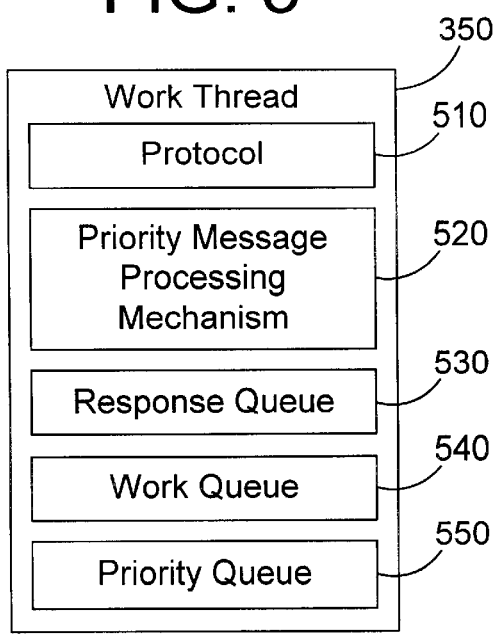
FIG. 5 is a block diagram of one sample implementation of a work thread in FIG. 3.

One suitable implementation of a work thread 350 in FIG. 3 is shown in FIG. 5. Work thread 350 includes a protocol 510, a priority message processing mechanism 520, a response queue 530, a work queue 540, and a priority queue 550. Work thread 350 is a thread of execution that actually performs the work of its corresponding job, as defined in protocol 510. Priority message processing mechanism 520 is a mechanism that assures that priority messages are processed as soon as possible, without waiting for processing other protocols that are received prior to the priority message. Response queue 530 contains responses to the currently-executing protocol. When main thread 342 receives a response to a work thread's currently-executing protocol in its main queue 420, the main thread 342 forwards this message to the response queue 530 of the appropriate work thread 350. Work queue 540 is a list of tasks (or protocols) that should be processed in the order they are placed on the work queue 540. The work thread 350 generally gets a protocol from the work queue 540 and processes the protocol, during which it generally receives one or more responses on the response queue 530. Once the protocol is complete, work thread 350 gets the next protocol from the work queue 540, and processes this protocol, assuming no priority messages have been received.

Priority queue 550 is a list of priority messages that may be executed before the execution of the next protocol on the work queue 540. Priority message processing mechanism 520 checks to see if there are any priority messages on the priority queue 550 before retrieving a protocol from work queue 540 for processing. If priority queue 550 contains one or more priority messages, priority message processing mechanism 520 causes work thread 350 to process the priority message instead of processing the next protocol on the work queue 540. In this manner priority message processing mechanism 520 expedites the processing of a priority message. Providing a response queue, work queue, priority queue, and priority message processing mechanism in all work threads in the group results in an architected way for all group members to individually process their messages, including priority messages, in an order that is consistent with the other members. While priority message processing mechanism 520 is shown in FIG. 5 as a distinct mechanism within work thread 350, the functions of priority message processing mechanism 520 could be integrated directly into the many functions of work thread 350 within the scope of the preferred embodiments.

Protocol 510 is a task that is comprised of multiple phases that work thread 350 can perform. The present invention is made possible by defining certain characteristics of the main thread 342 and by defining certain characteristics of protocol 510.

For the preferred embodiments, the state of a group member depends on two conditions: 1) responsiveness; and 2) progress. Responsiveness means that a member is able to read group messages. Progress means working meaningfully on a protocol (e.g., not in an infinite wait or in an endless loop). If a group member is responsive and is making progress, then it presumed to be operating correctly.

The responsiveness of a group member is assured in the preferred embodiments by having a main thread 342 in each job 340. Main thread 342 performs limited functions that assure responsiveness. The main thread 342 only reads messages, forwards protocol messages to its work thread(s) 350, prioritizes messages as needed, and executes special messages, such as messages to terminate a work thread or to terminate the member job. No main thread can do any work that could lead to it not being available to read messages. This means that the main thread 342 cannot generate any acknowledge (ACK) rounds, because waiting on an ACK round could result in the main thread being unavailable to read a message. In addition, the main thread 342 cannot wait to acquire a local resource, because waiting may also result in the main thread being unavailable to read a message. By defining the main thread in this manner, we know that the main thread will always be available to read a message, so the other group members need not be concerned that a sent message was not received by another member. This means that each member can send messages to the group without explicitly checking to see if the messages were received.

Figure 6:
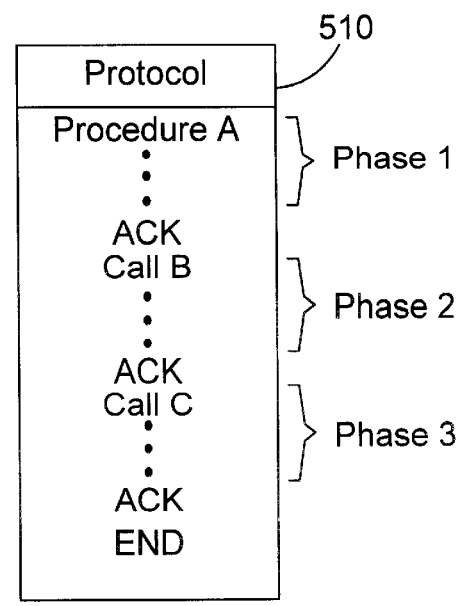
FIG. 6 is a block diagram of one sample implementation of a protocol that is executed by the work thread of FIG. 5.

Progress of a group member is assured by appropriately defining the structure of the protocol 510. Referring to FIG. 6, a protocol 510 in accordance with the preferred embodiments is divided into a number of different phases divided by ACK rounds. Each phase is defined in a way that assures that the member only does local work during a phase. When information is needed from another member, the information is sent through CLUE and is followed by an ACK round. The result is that progress is ensured between ACK rounds, and any failure during an ACK round will be communicated by the failing member either issuing a negative acknowledge (NACK) response or unregistering with CLUE. CLUE guarantees that if a member fails to respond during an ACK round (and thus unregisters with CLUE), CLUE sends a special message known as a membership change to all members left in the group. The membership change is treated as a NACK signal from the member that did not respond. The remaining members in response to a NACK signal may undo the changes that were made during execution of the protocol, or may determine that the failure of the dead member is not significant, and continue processing the protocol.

In the preferred embodiments, each phase of protocol 510 is implemented in a different procedure (or code portion). Thus, as shown in FIG. 6, procedure A executes phase 1, followed by an ACK round. After the ACK round, procedure A calls procedure B, which executes phase 2, followed by another ACK round. After the second ACK round, procedure B calls procedure C, which executes phase 3, followed by another ACK round. After the third ACK round, the protocol has been processed to completion.

The nesting of phases as shown by way of example in FIG. 6 makes an "undo" function easier to perform. If a group member needs to "undo" its work on a protocol for some reason (such as a NACK from another group member or a membership change), each phase only has to undo what it did, without concern for what happened outside of it. This allows simpler code that is easier to follow, because what a phase does, it also undoes.

Because we know that the main thread 342 on each group member is always responsive, we know that each group member will receive and recognize a membership change. Because the work thread(s) only do local work between ACK rounds, the work thread will always progress to an ACK round (assuming no local deadlock), so each member is assured to see the membership change. Defining protocols such that only local work is done between ACK rounds means that a group member will always progress to an ACK round. Providing a main thread for each group member means that a group member will always be responsive. By assuring both progress and responsiveness in this manner, group members will simply unregisters with CLUE if an error occurs, resulting in a membership change message from CLUE to remaining group members. This membership change is interpreted as an error condition, and job 340 can then determine what actions to take, if any, as a result of the failure.

Figure 7:
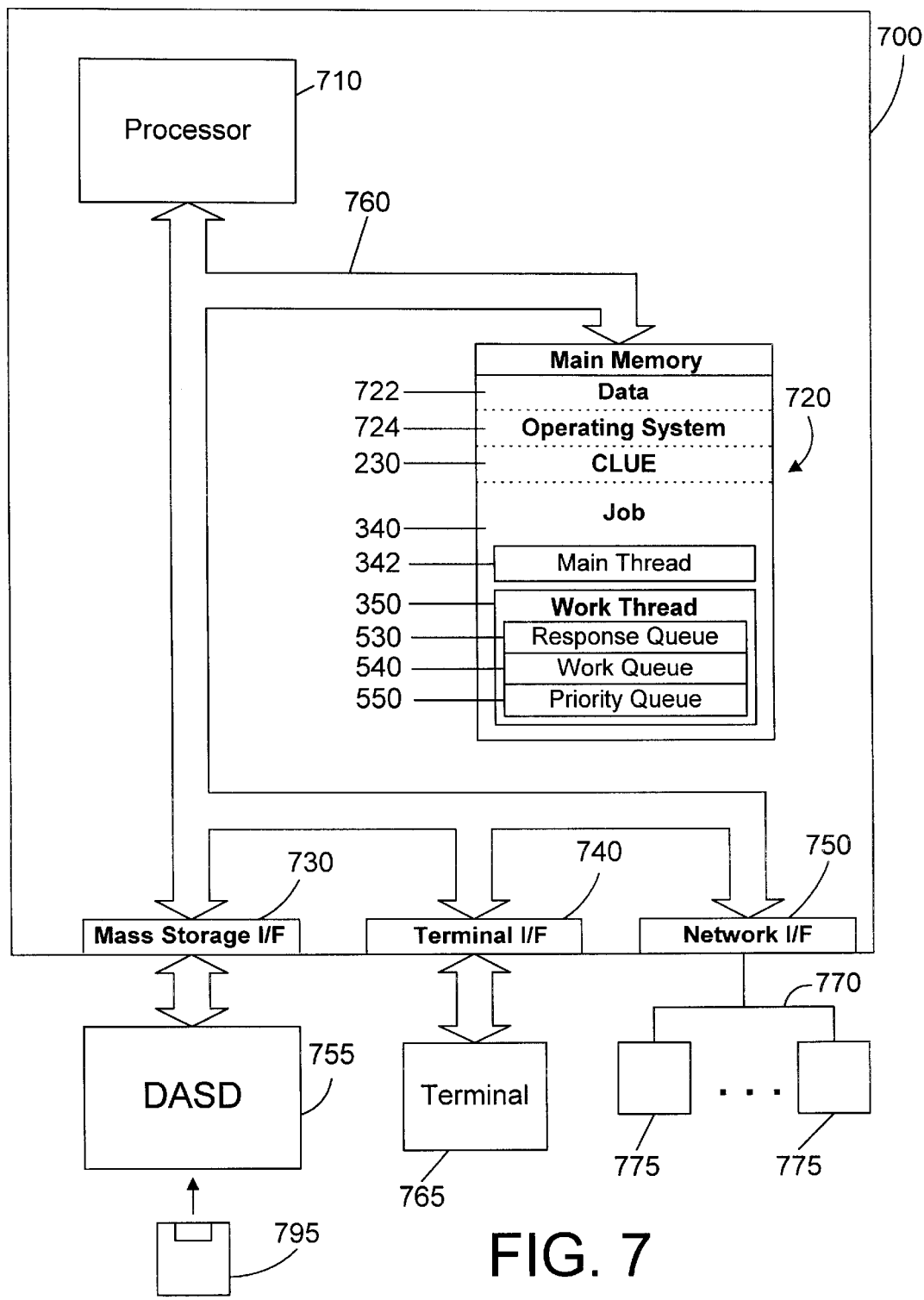
FIG. 7 is a block diagram of a computer system in accordance with the preferred embodiments that serves as a node in a cluster.

Referring now to FIG. 7, a computer system 700 is an enhanced IBM AS/400 computer system, and represents one suitable type of node 310 (FIG. 3) that can be networked together in accordance with the preferred embodiments. Those skilled in the art will appreciate that the mechanisms and apparatus of the present invention apply equally to any computer system that can be networked together with other computer systems. As shown in FIG. 7, computer system 700 comprises a processor 710 connected to a main memory 720, a mass storage interface 730, a terminal interface 740, and a network interface 750. These system components are interconnected through the use of a system bus 760. Mass storage interface 730 is used to connect mass storage devices (such as a direct access storage device 755) to computer system 700. One specific type of direct access storage device 755 is a floppy disk drive, which may store data to and read data from a floppy diskette 795.

Main memory 720 contains data 722, an operating system 724, a cluster engine (CLUE) 230, and one or more jobs 340 that each contain a main thread 342 and one or more work threads 350. Data 722 represents any data that serves as input to or output from any program in computer system 700. Operating system 724 is a multitasking operating system known in the industry as OS/400; however, those skilled in the art will appreciate that the spirit and scope of the present invention is not limited to any one operating system. CLUE 230 is a cluster engine that communicates with other computer systems in a defined cluster. In the preferred embodiments, CLUE 230 enforces ordered messages, which means that each member in the cluster will see messages in the same order. In the preferred embodiments, CLUE 230 is a known cluster engine with functions as described above. However, it is equally within the scope of the present invention to provide a cluster engine 230 that has new or different attributes when compared to known cluster engines.

A job 340 can be a member of a group on a cluster that executes a defined protocol. Each job contains one main thread 342 and one or more work threads 350. The main thread 342 includes the features described above with reference to FIG. 4, and is defined to have no ACK rounds so it can never get stuck waiting on another member of the group. In addition, main thread 342 is defined in a way that assures it will never get stuck doing local work. This means, for example, that a main thread 342 cannot wait to acquire a local resource. The work thread(s) are described above with reference to FIG. 5. Each work thread executes a protocol 510 or a portion of a protocol 510, and communicates with the other group members (through the main thread 342 and CLUE 230) at ACK rounds defined in the protocol. In addition, the main thread 342 passes messages as appropriate into the response queue 530, work queue 540, and priority queue 550 of the work thread 350. Work thread 350 determines whether a priority message is present in the priority queue before retrieving the next message from the work queue, and processes any priority messages before processing the next message on the work queue.

Computer system 700 utilizes well known virtual addressing mechanisms that allow the programs of computer system 700 to behave as if they only have access to a large, single storage entity instead of access to multiple, smaller storage entities such as main memory 720 and DASD device 755. Therefore, while data 722, operating system 724, CLUE 230, and jobs 340 are shown to reside in main memory 720, those skilled in the art will recognize that these items are not necessarily all completely contained in main memory 720 at the same time. It should also be noted that the term "memory" is used herein to generically refer to the entire virtual memory of computer system 700.

Processor 710 may be constructed from one or more microprocessors and/or integrated circuits. Processor 710 executes program instructions stored in main memory 720. Main memory 720 stores programs and data that processor 710 may access. When computer system 700 starts up, processor 710 initially executes the program instructions that make up operating system 724. Operating system 724 is a sophisticated program that manages the resources of computer system 700. Some of these resources are processor 710, main memory 720, mass storage interface 730, terminal interface 740, network interface 750, and system bus 760.

Although computer system 700 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 710. However, those skilled in the art will appreciate that the present invention applies equally to computer systems that simply use I/O adapters to perform similar functions.

Terminal interface 740 is used to directly connect one or more terminals 765 to computer system 700. These terminals 765, which may be non-intelligent (i.e., dumb) terminals or fully programmable workstations, are used to allow system administrators and users to communicate with computer system 700. Note, however, that while terminal interface 740 is provided to support communication with one or more terminals 765, computer system 700 does not necessarily require a terminal 765, because all needed interaction with users and other processes may occur via network interface 750.

Network interface 750 is used to connect other computer systems and/or workstations (e.g., 775 in FIG. 7) to computer system 700 across a network 770. Network 770 represents the logical connections between computer system 700 and other computer systems on the network 770. The present invention applies equally no matter how computer system 700 may be connected to other computer systems and/or workstations, regardless of whether the network connection 770 is made using present-day analog and/or digital techniques or via some networking mechanism of the future. In addition, many different network protocols can be used to implement a network. These protocols are specialized computer programs that allow computers to communicate across network 770. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 795 of FIG. 7) and CD ROM, and transmission type media such as digital and analog communications links.

Figure 8:
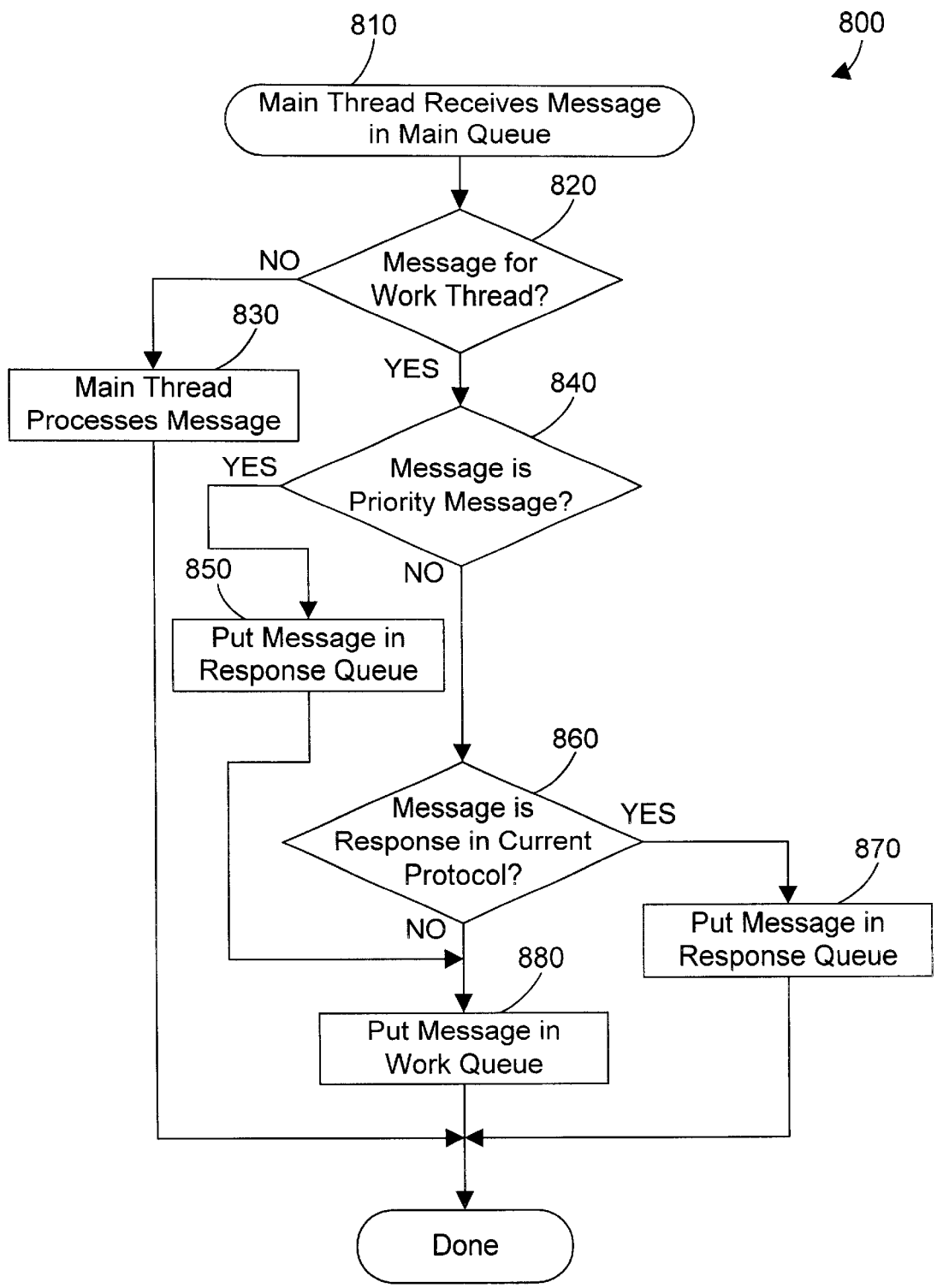
FIG. 8 is a flow diagram of a method in accordance with the preferred embodiments for the main thread to handle messages it receives.

Referring to FIG. 8, a method 800 illustrates the steps a main thread 342 performs in processing a message received from CLUE 230. Method 800 begins when the main thread 342 receives a message in its main queue 420 (step 810). In the preferred embodiments, main queue 420 receives all messages from CLUE 230. If the received message is a message of a type that is processed by the main thread (step 820=NO), the main thread processes the message (step 830) without passing the message to the work thread 350. If the message is of a type that identifies the message as intended for the work thread (step 820=YES), method 800 determines whether the message is a priority message (step 840). If the message is a priority message (step 840=YES), the message is put on the response queue (step 850) and on the work queue (step 880). If the message is not a priority message (step 840=NO), method 800 next determines whether the message is in response to a currently-executing protocol, if any (step 860). If the message is in response to a currently-executing protocol (step 860=YES), the message is placed in the response queue 530 of the work thread 350 (step 870). If the message is not in response to a currently-executing protocol, or if there is no protocol that is currently executing (step 860=NO), the message is placed in the work queue 540 of the work thread 350 (step 880). Referring again to FIG. 5, work thread 350, when executing a protocol, processes all message in its response queue 530 until the protocol is complete. Once the protocol has been executed, priority message processing mechanism 520 checks the priority queue 550 to see if there are any priority messages. If not, priority message processing mechanism 520 retrieves from the work queue 540 the next protocol to execute. By processing messages on the priority queue before the next message on the work queue, a priority message may now be processed out-of-order with respect to previously-received protocols on the work queue, because all nodes have similar mechanisms that recognize and process priority messages in the same manner.

Figure 9A:
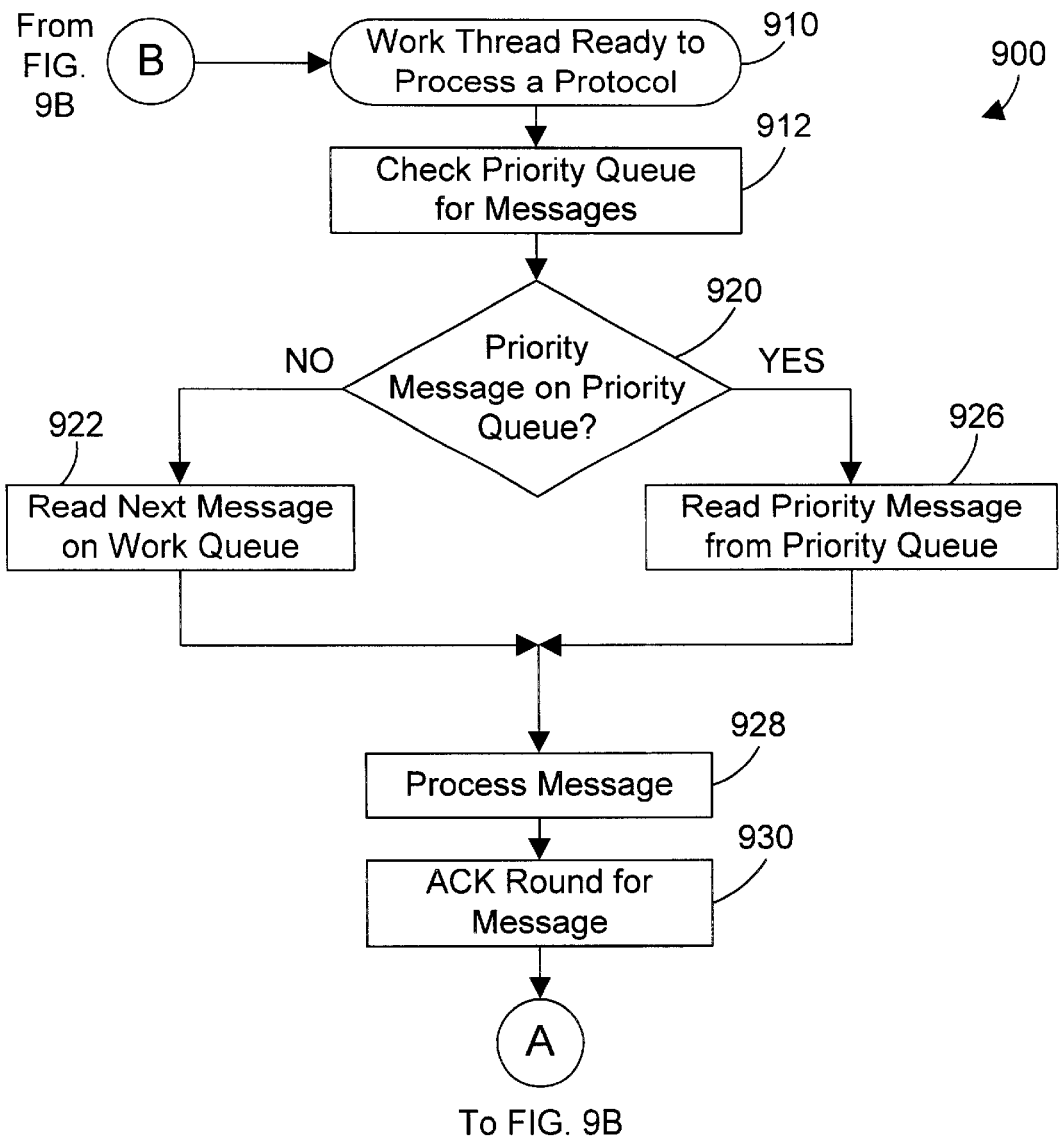
FIGS. 9A and 9B are each portions of a flow diagram of a method in accordance with the preferred embodiments for a work thread to process messages.
Figure 9B:
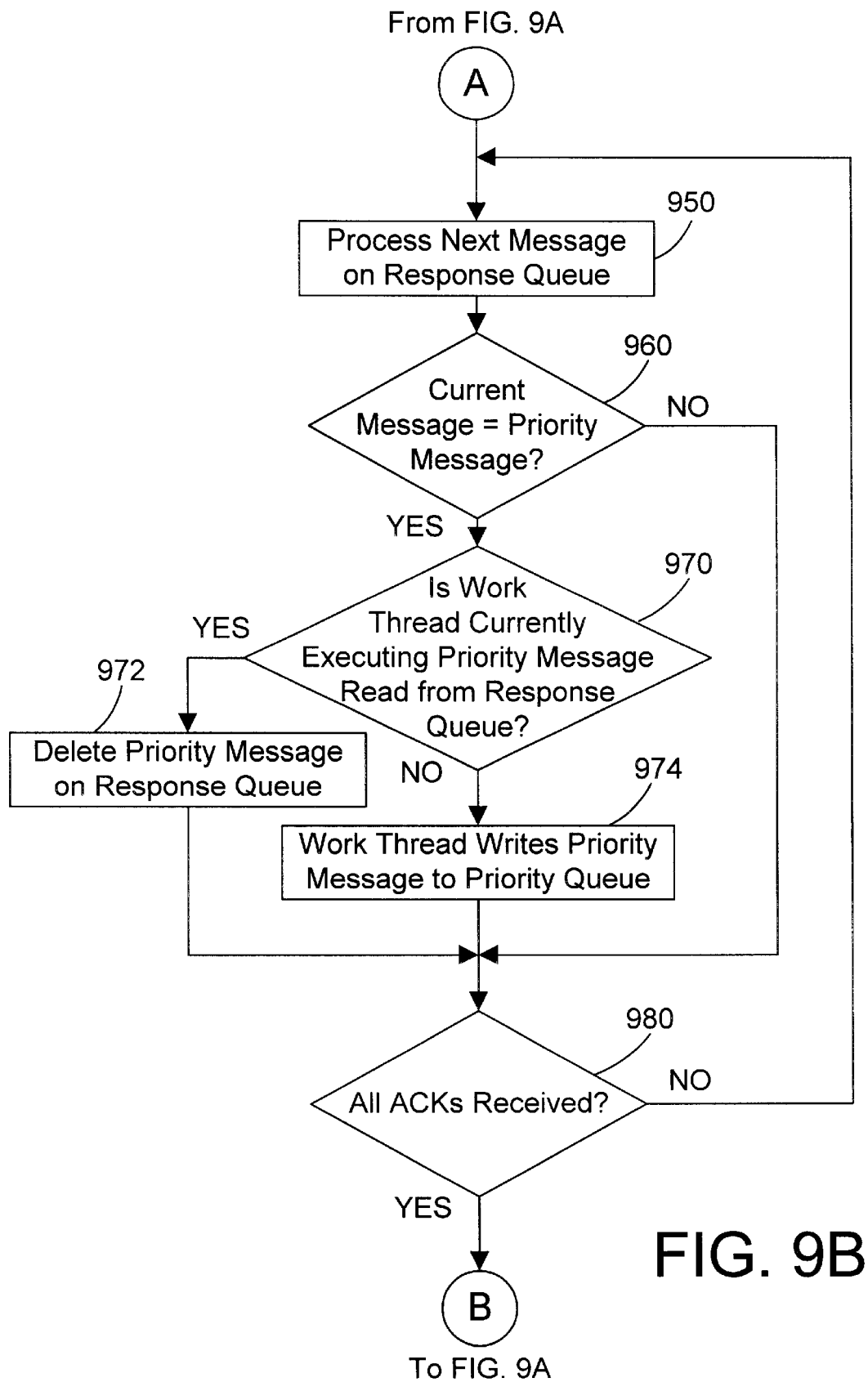

Referring now to FIGS. 9A and 9B, a method 900 describes the steps suitably performed by the priority message processing mechanism 520 of FIG. 5. Method 900 begins when the work thread is ready to process a protocol (step 910). This condition implies that the work thread is not currently executing a protocol. First, method 900 checks the priority queue for priority messages (step 912). If a priority message is in the priority queue (step 920=YES), the priority message is read from the priority queue (step 926) and processed (step 928) by the work thread. The priority message by definition will include one or more ACK rounds (step 930). During an ACK round, the work thread processes the next message on the response queue (step 950), as shown in FIG. 9B. If the current message read from the response queue is a priority message (step 960=YES), method 900 then determines whether the work thread is currently executing the priority message read from the response queue (step 970). If not (step 970=NO), the work thread writes the priority message just read from the response queue to the priority queue (step 974). If the work thread is currently executing the priority message just read from the response queue (step 970=YES), the priority message is deleted from the response queue (step 972). This step is essentially a cleanup step that gets rid of the priority message on the response queue that was written by the main thread once the priority message is being executed by the work thread. If the current protocol is done (step 980=YES), method 900 returns to step 910 in FIG. 9A, where the work thread is ready to process the next protocol. If the protocol is not done (step 980=NO), method 900 loops back to step 950 in FIG. 9B and continues.

If there is no priority message on the priority queue (step 920=NO), the work thread reads the next message on the work queue (step 922) and processes this message (step 928), including any ACK rounds (step 930). Method 900 then goes to step 950 in FIG. 9B to process the messages on the response queue, as described above.

Methods 800 and 900 can be summarized in words to help understand the logic behind the method steps. We assume from method 800 that when a response message to a currently-executing protocol is received by the main thread, the main thread writes the response message to the response queue in the work thread. When the next protocol to be executed (that is not a priority message) is received by the main thread, the main thread writes the protocol to the work queue in the work thread. When a priority message is received by the main thread, the main thread writes the priority message to the work queue and to the response queue in the work thread.

A priority message is written to both the work queue and the response queue in the work thread to assure that the priority message is processed as soon as the work thread is ready to process the next protocol. If the work thread is busy processing a protocol when the priority message is written to the work queue and response queue, the work thread will see the priority message on the response queue, and will write the priority message to the priority queue in step 974 so that it will process the priority message once the currently-executed protocol is complete. If the work thread is not busy processing a protocol when the priority message is written to the work queue and response queue, the work thread will see the priority message as the next message to be processed on the work queue, and will process the priority message next. In this manner a priority message may be processed out-of-order with respect to other messages, but the priority message will be processed in the same order on all nodes, thus assuring that the ordered messages do not get out of sync.

The present invention as described with reference to the preferred embodiments herein provides significant improvements over the prior art. When a special event such as a failure occurs, a priority message may be sent to the work thread, which causes the work thread to process the priority message when the work thread processes the next protocol. This allows the work thread to act on the priority message before processing other non-priority messages that were received before the priority message, while assuring that all nodes process the priority message in the same order with respect to the other messages.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
    at least one processor;
    a memory coupled to the at least one processor;
    a cluster engine residing in the memory and executed by the at least one processor, the cluster engine providing ordered messages;
    a job residing in the memory and executed by the at least one processor, the job including:
        at least one work thread that performs at least one predefined task, the work thread including a priority queue that receives priority messages, the work thread processing a priority message on the priority queue before processing a next task to be processed that was received before the priority message;
        a main thread that receives messages from at least one computer system coupled to the apparatus and that routes a priority message to the at least one work thread.

2. The apparatus of claim 1 wherein the at least one predefined task comprises a protocol that includes at least one acknowledge (ACK) round, and that performs only local processing between ACK rounds.

3. The apparatus of claim 1 wherein the main thread performs only local processing.

4. The apparatus of claim 1 wherein the main thread does not wait for any local resource, and thus is guaranteed to receive a message sent by the cluster engine.

5. The apparatus of claim 1 wherein the at least one work thread further includes a response queue and a work queue, and wherein the main thread routes a message for the at least one work thread to at least one of the response queue and the work queue, depending on the type of the message.

6. The apparatus of claim 5 wherein the main thread routes the message to the response queue if the message is a response to a currently-executing task.

7. The apparatus of claim 5 wherein the main thread routes the message to the work queue if the message is not a response to a currently-executing task.

8. The apparatus of claim 5 wherein the main thread routes the message to the response queue and to the work queue if the message is a priority message.

9. A networked computer system comprising:
  a cluster of computer systems that each includes:
    a network interface that couples each computer system via a network to other computer systems in the cluster;
    a memory;
    a cluster engine residing in the memory and executed by the at least one processor, the cluster engine providing ordered messages; and
    a job residing in the memory, the job including:
      at least one work thread that performs at least one predefined task, the work thread including a priority queue that receives priority messages, the work thread processing a priority message on the priority queue before processing a next task to be processed that was received before the priority message; and
      a main thread that receives messages from at least one computer system coupled to the apparatus and that routes a priority message to the at least one work thread.

10. An apparatus comprising:
  (1) at least one processor;
  (2) a memory coupled to the at least one processor;
  (3) a cluster engine residing in the memory and executed by the at least one processor, the cluster engine providing ordered messages;
  (4) a job residing in the memory and executed by the at least one processor, the job including:
    (4A) at least one work thread that performs at least one predefined task that includes at least one synchronization event, wherein the work thread comprises:
      (4A1) a response queue that receives messages relating to a currently-executing task;
      (4A2) a work queue that receives new tasks to be executed; and
      (4A3) a priority queue that receives priority messages;
      (4A4) a priority message processing mechanism within the work thread that processes a priority message on the priority queue before processing a next task to be processed that was received before the priority message;
    (4B) a main thread that registers with a cluster engine to become a member of a group of jobs that executed on a plurality of computer systems coupled to the apparatus, that receives messages from at least one of the plurality of computer systems, and that routes priority messages to at least one of the response queue and the work queue, depending on the type of the message.

11. A computer-implemented method for processing a task using a plurality of jobs that form a group in a clustered computing environment, the method comprising the steps of:
  providing a cluster engine for each member of the group that communicates with the other cluster engines in the group, the cluster engine providing ordered messages to its corresponding group member;
  providing at least one work thread for each job that executes the task, the at least one work thread including a priority queue that receives priority messages, the work thread processing a priority message before processing a next task to be processed that was received before the priority message;
  providing a main thread for each job, the main thread performing the steps of: receiving messages from other members of the group via the cluster engine corresponding to the main thread; and
  routing a priority message for the at least one work thread to the priority queue.

12. The method of claim 11 wherein the task comprises a protocol that includes at least one acknowledge (ACK) round, and that performs only local processing between ACK rounds.

13. The method of claim 11 wherein the main thread performs only local processing.

14. The method of claim 11 wherein the main thread does not wait for any local resource, and thus is guaranteed to receive a message sent by the cluster engine.

15. The method of claim 11 wherein the at least one work thread further includes a response queue and a work queue, and wherein the main thread routes a message for the at least one work thread to at least one of the response queue and the work queue, depending on the type of the message.

16. The method of claim 15 wherein the main thread routes the message to the response queue if the message is a response to a currently-executing task.

17. The method of claim 15 wherein the main thread routes the message to the work queue if the message is not a response to a currently-executing task.

18. The method of claim 15 wherein the main thread routes the message to the response queue and to the work queue if the message is a priority message.

19. A computer-implemented method for processing a task using a plurality of jobs that form a group in a clustered computing environment, the method comprising the steps of:
  (1) providing a cluster engine for each member of the group that communicates with the other cluster engines in the group, the cluster engine providing ordered messages to its corresponding group member;
  (2) providing at least one work thread for each job that executes the task, the at least one work thread comprising:
    (2A) a response queue that receives messages relating to a currently-executing task;
    (2B) a work queue that receives new tasks to be executed; and
    (2C) a priority queue that receives priority messages;
    (2D) a priority message processing mechanism within the work thread that processes a priority message on the priority queue before processing a next task to be processed that was received before the priority message;
  (3) providing a main thread for each job, the main thread performing the steps of:
    (3A) registering with a cluster engine to become a member of a group of jobs that executed on a plurality of computer systems coupled to the apparatus;

(3B) receiving messages from the cluster engines in the other members of the group;

(3C) routing messages received from the cluster engines in the other members of the group to at least one of the response queue and the work queue in the at least one work thread depending on the type of the message; and (3D) routing priority messages to the priority queue.

20. The method of claim 19 wherein step (3C) routes the message to the response queue if the message is a response to a currently-executing task, routes the message to the work queue if the message is not a response to a currently-executing task; and routes the message to the response queue and to the work queue if the message is a priority message.

21. A program product comprising:
(A) a computer program comprising:
at least one work thread that performs at least one predefined task, the work thread including a priority queue that receives priority messages, the work thread processing a priority message on the priority queue before processing a next task to be processed that was received-before the-priority message;
a main thread that receives messages from at least one computer system and that routes a priority message for the at least one work thread to the at least one work thread; and
(B) computer-readable signal bearing media bearing the computer program.

22. The program product of claim 21 wherein the signal bearing media comprises recordable media.

23. The program product of claim 21 wherein the signal bearing media comprises transmission media.

24. The program product of claim 21 wherein the at least one predefined task comprises a protocol that includes at least one acknowledge (ACK) round, and that performs only local processing between ACK rounds.

25. The program product of claim 21 wherein the main thread performs only local processing.

26. The program product of claim 21 wherein the main thread does not wait for any local resource, and thus is guaranteed to receive a message sent by the cluster engine.

27. The program product of claim 21 wherein the at least one work thread further includes a response queue and a work queue, and wherein the main thread routes a message for the at least one work thread to at least one of the response queue and the work queue, depending on the type of the message.

28. The program product of claim 27 wherein the main thread routes the message to the response queue if the message is a response to a currently-executing task.

29. The program product of claim 27 wherein the main thread routes the message to the work queue if the message is not a response to a currently-executing task.

30. The program product of claim 27 wherein the main thread routes the message to the response queue and to the work queue if the message is a priority message.

31. A program product comprising:
(1) a computer program comprising:
(1A) at least one work thread that performs a predefined task that includes at least one synchronization event, wherein the work thread comprises:
(1A1) a response queue that receives messages relating to a currently-executing task;
(1A2) a work queue that receives new tasks to be executed; and
(1A3) a priority queue that receives priority messages;
(1A4) a priority message processing mechanism within the work thread that processes a priority message on the priority queue before processing a next task to be processed that was received before the priority message;
(1B) a main thread that registers with a cluster engine to become a member of a group of jobs that execute on a plurality of computer systems to perform the predefined task, that receives messages from at least one of the plurality of computer systems, and that routes priority messages to at least one of the response queue and the work queue in the at least one work thread depending on the type of the message; and
(2) computer-readable signal bearing media bearing the computer program.

32. The program product of claim 31 wherein the signal bearing media comprises recordable media.

33. The program product of claim 31 wherein the signal bearing media comprises transmission media.

34. The program product of claim 31 wherein the synchronization event comprises an acknowledge (ACK) round.

* * * * *